(12) United States Patent
Savvides et al.

(10) Patent No.: US 12,327,338 B2
(45) Date of Patent: Jun. 10, 2025

(54) METHODS FOR IMPROVING DATASETS FOR SKELETON-BASED ACTION DETECTION

(71) Applicants: CARNEGIE MELLON UNIVERSITY, Pittsburgh, PA (US); AnyVision Interactive Technologies, Ltd., Holon (IL)

(72) Inventors: Marios Savvides, Pittsburgh, PA (US); Yu Kai Huang, Pittsburgh, PA (US); Eddie Yu, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 46 days.

(21) Appl. No.: 18/491,258

(22) Filed: Oct. 20, 2023

(65) Prior Publication Data

US 2024/0135503 A1 Apr. 25, 2024
US 2024/0233095 A9 Jul. 11, 2024

Related U.S. Application Data

(60) Provisional application No. 63/419,118, filed on Oct. 25, 2022, provisional application No. 63/417,820, filed on Oct. 20, 2022.

(51) Int. Cl.
| | |
|---|---|
| G06T 5/70 | (2024.01) |
| G06T 3/4007 | (2024.01) |
| G06T 3/60 | (2024.01) |
| G06T 5/20 | (2006.01) |
| G06T 7/20 | (2017.01) |
| G06T 7/60 | (2017.01) |

(52) U.S. Cl.
CPC .............. *G06T 5/70* (2024.01); *G06T 3/4007* (2013.01); *G06T 3/60* (2013.01); *G06T 5/20* (2013.01); *G06T 7/20* (2013.01); *G06T 7/60* (2013.01); *G06T 2207/20032* (2013.01); *G06T 2207/20044* (2013.01)

(58) Field of Classification Search
CPC ........... G06T 5/70; G06T 3/4007; G06T 3/60; G06T 5/20; G06T 7/20; G06T 7/60; G06T 2207/20032; G06T 2207/20044
See application file for complete search history.

(56) References Cited

U.S. PATENT DOCUMENTS

| | | | | |
|---|---|---|---|---|
| 7,852,412 B1 * | 12/2010 | Guerrero | .................. | H04N 5/21 |
| | | | | 348/625 |
| 2008/0239094 A1 * | 10/2008 | Baqai | ................... | H04N 23/843 |
| | | | | 348/207.99 |
| 2022/0125337 A1 * | 4/2022 | Assouline | ............... | G06T 13/40 |
| 2023/0148855 A1 * | 5/2023 | Wang | ...................... | A61B 1/31 |
| | | | | 382/128 |

* cited by examiner

*Primary Examiner* — Kyu Chae
(74) *Attorney, Agent, or Firm* — KDW FIRM PLLC

(57) ABSTRACT

Disclosed here are various techniques for improving the testing and training of datasets comprising sequences of skeletal representations performing various actions. The dataset can be denoised by applying various techniques to determine noisy frames within each sequence and eliminating the sequences from the dataset when the number of noisy frames in the sequence is too large. In addition, the dataset may be augmented by various data augmentation techniques to manipulate the skeletal representations, after denoising.

20 Claims, 27 Drawing Sheets

1-BASE OF THE SPINE
2-MIDDLE OF THE SPINE
3-NECK
4-HEAD
5-LEFT SHOULDER
6-LEFT ELBOW
7-LEFT WRIST
8-LEFT HAND
9-RIGHT SHOULDER
10-RIGHT ELBOW
11-RIGHT WRIST
12-RIGHT HAND
13-LEFT HIP
14-LEFT KNEE
15-LEFT ANKLE
16-LEFT FOOT
17-RIGHT HIP
18-RIGHT KNEE
19-RIGHT ANKLE
20-RIGHT FOOT
21-SPINE
22-TIP OF THE LEFT HAND
23-LEFT THUMB
24-TIP OF THE RIGHT HAND
25-RIGHT THUMB

| | | |
|---|---|---|
| |  |  |
| W SHEAR 45 |  |  |
| W SHEAR 60 |  |  |

| |  |  |
|---|---|---|
| W GAUSSIAN [0, 1.5] |  |  |

| | | |
|---|---|---|
| |  |  |
| \W ROT [-30,30] + \W GAUSSIAN [0, 1.5] |  |  |
| \W ROT [-30,30]+ \W HORIZONTAL FLIP |  |  |

|  | | |
|---|---|---|
|  |  |  |
| \W SHEAR [-45, 45] +<br>\W SCALING [0.6, 1.4] |  |  |
| \W SHEAR [-45, 45]+<br>\W GAUSSIAN [0, 1.5] |  |  |

|  |  |  |
|---|---|---|
|  |  |  |
| \W SHEAR [-45, 45] +<br>\W HORIZONTAL FLIP |  |  |
|  |  |  |

FIG. 13

|  |  |  |
|---|---|---|
|  |  |  |
| \W GAUSSIAN [0, 1.5] +<br>\W HORIZONTAL FLIP |  |  |
|  |  |  |

| | | |
|---|---|---|
| |  |  |
| \W ROT [-30,30] +<br>\W SHEAR [-45, 45] +<br>\W SCALING [0.6, 1.4] |  |  |
| \W SCALING [0.6, 1.4] +<br>\W GAUSSIAN [0, 1.5] +<br>\W HORIZONTAL FLIP |  |  |

| | | |
|---|---|---|
| |  |  |
| \W ROT [-30,30] +<br>\W SHEAR [-45, 45] +<br>\W SCALING [0.6, 1.4] +<br>\W GAUSSIAN [0, 1.5] |  |  |
| \W SHEAR [-45, 45] +<br>\W SCALING [0.6, 1.4] +<br>\W GAUSSIAN [0, 1.5] +<br>\W HORIZONTAL FLIP |  |  |

|  |  |  |
|---|---|---|
|  |  |  |
| \W ROT [-30,30] +<br>\W SHEAR [-45, 45] +<br>\W SCALING [0.6, 1.4] +<br>\W GAUSSIAN [0, 1.5]<br>\W HORIZONTAL FLIP |  |  |
|  |  |  |

METHODS FOR IMPROVING DATASETS FOR SKELETON-BASED ACTION DETECTION

RELATED APPLICATIONS

This application claims the benefit of U.S. Provisional Patent Applications Nos. 63/417,820, filed Oct. 20, 2022 and 63/419,118, filed Oct. 25, 2022, the contents of which are incorporated herein in their entireties.

BACKGROUND OF THE INVENTION

Skeleton-based action recognition is a computer vision task that involves recognizing human actions from 3D skeletal joint data captured, for example, from sequential frames of a video clip. A variety of sensors can be used for the capture of the video sequence, for example, standard video cameras, Microsoft Kinect devices, Intel RealSense devices and other wearable devices.

Various algorithms can be used to detect, identify and classify human actions from the skeletal joint data. Spatial Temporal Graph Convolutional Networks (ST-GCN), progressive binary graph convolutional networks (PB-GCN), attention enhanced graph convolutional LSTM network (AGC-LSTM), decoupling spatial aggregation (DC-GCN+ADG), multi-scale (+multi-pathway) aggregation scheme (MS-G3D), and channel-wise topology refinement (CTR-GCN) are all examples of algorithms and systems that can be used to detect and classify human actions from skeletal joint data.

The models may be trained to recognize a pre-selected set of actions. For example, standing, walking, running, sitting, lying down, getting up, crouching, kneeling, falling down, fighting, etc. The recognized actions can then be used in various applications such as human-computer interaction, sports analysis, and surveillance.

Of particular interest for purposes of this invention is the ST-GCN model, which automatically learns both spatial and temporal patterns from data The model designs generic representations of skeleton sequences for action recognition by extending graph neural networks to a spatial-temporal graph model wherein the graph is constructed by connecting the same joints across consecutive frames.

FIG. 1. Is an illustration of a spatial temporal graph of a skeleton sequence used by ST-GCN. The dots denote the body joints. The intra-body edges between body joints are defined based on the natural connections in human bodies. The inter-frame edges connect the same joints between consecutive frames. The coordinates of the joints are used as inputs to the ST-GCN. FIG. 2 is a block diagram illustrating ST-GCN. Pose estimation is performed on videos and spatial temporal graph of skeleton sequences are constructed Multiple layers of spatial-temporal graph convolution (ST-GCN) are the applied and higher-level feature maps are gradually generated on the graph. Classifications is performed by a standard Softmax classifier to a corresponding action category. The model uses spatial configuration partitioning for constructing convolution operations and learnable edge importance weighting.

One advantage of the ST-GCN model is that it is small and fast, and, as such, is appropriate for use on edge devices. The trade-off for fast and small is accuracy. For example, during failure case studies, it was found that that fighting actions like hitting, wielding a knife and pushing, may be misclassified by the current model. Therefore, it would be desirable to improve the accuracy of the model without sacrificing speed.

SUMMARY OF THE INVENTION

The purpose of the present invention is to improve the accuracy of the ST-GCN model without sacrificing the speed with which the model operates. This is accomplished by various pre-processing data augmentation steps disclosed herein. Although the techniques are explained in the context of their use with the ST-GCN model and are tailored for use with ST-GCN model, as would be realized by one of skill in the art, the techniques may be used by other models as well.

To solve this issue with ST-GCN, the training data is augmented using various techniques. In one embodiment, the techniques include 2D rotation, 2D shear, scaling, horizontal flips and the addition of Gaussian noise. The augmentation techniques may be applied in any combination. In a second embodiment, a denoising process is applied to both the training data and to input data after deployment. The denoising occurs when it is not straightforward to identify the joints, for example, when there is more than one person in the video frames and one person occludes another, or wherein joints are in awkward positions.

BRIEF DESCRIPTION OF THE DRAWINGS

FIGS. 10-17 illustrate the effects of the application of various combinations of data augmentation transforms.

DETAILED DESCRIPTION

Figure 1:
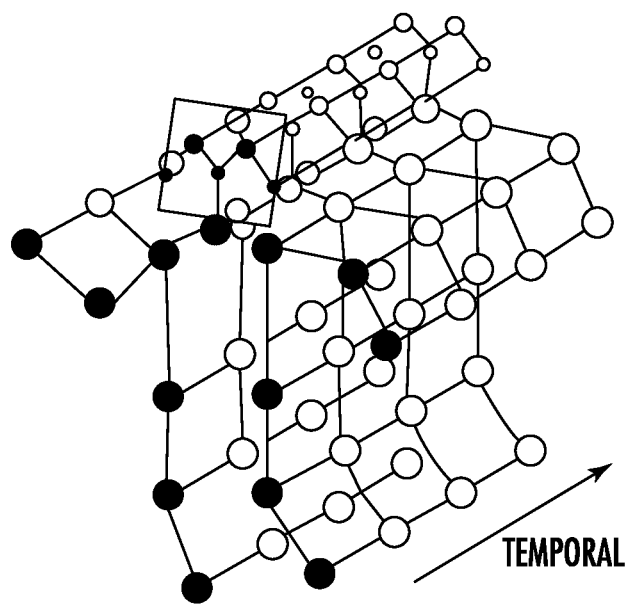
FIG. 1 shows the tracking of the joints of a skeletal representation of a person through multiple frames of a video, providing a temporal component to the analysis of the depicted action.
Figure 2:
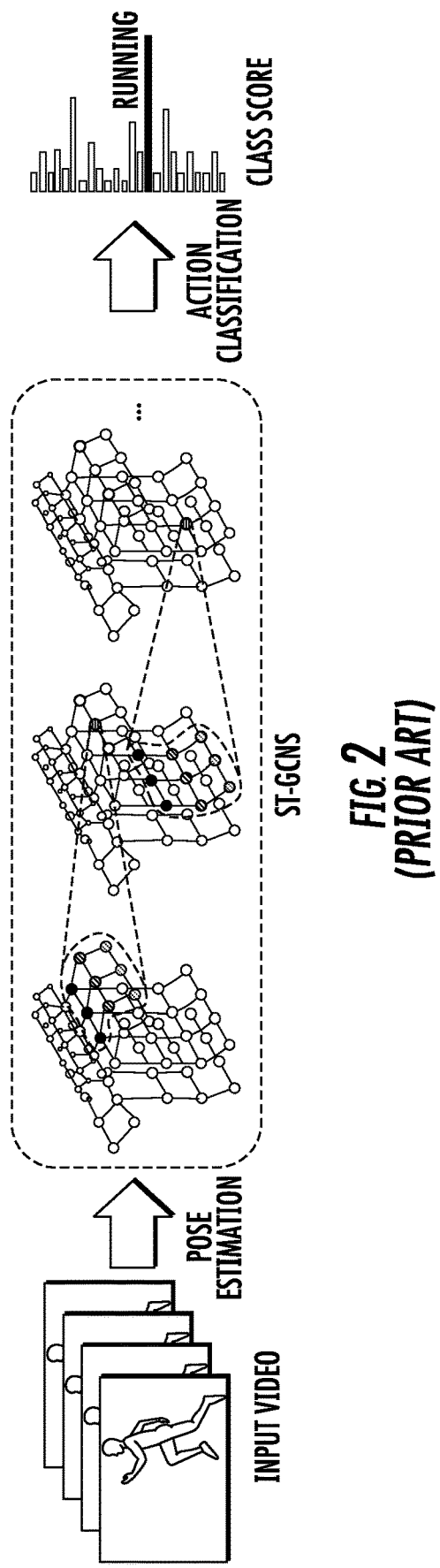
FIG. 2 is a block diagram of the ST-GCN model for identifying and classifying the actions.
Figure 3:
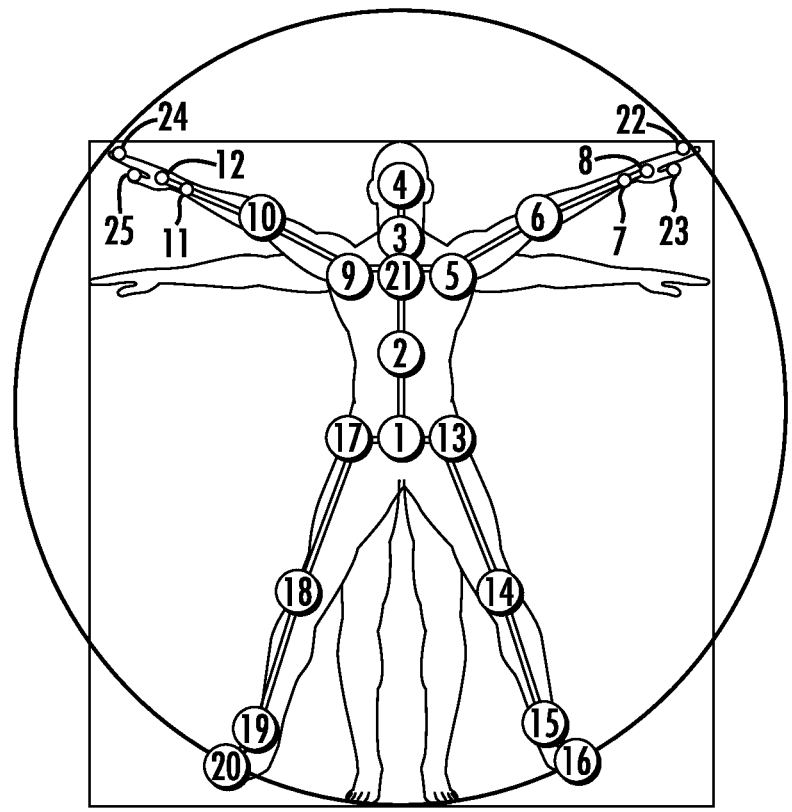
FIG. 3 is an illustration of a scheme for identifying the joints of a person depicted in the frames of a video by number.

The action identification process for the ST-GNC model and other action identification models relies on an input of both training and testing data that comprises an indication of the position of the joints of a person depicted in video frames. FIG. 3 shows one possible exemplary scheme for identifying the joints by number. In other embodiments, any alternate scheme for identifying the joints may be used. The input to the identification model will typically be in the form of a file containing the location of each joint with respect to a coordinate system defined in the context of a video frame. The input file may also contain other information, for example, the number of recorded frames in the video, the number of observed skeletons appearing in the current frame, the number of identified joints and the orientation of each joint. Other information may also be present in the file. In various embodiments, a separate file may be used for each frame of the video, or the data for all frames of the video may be present in a single file.

Figure 4:
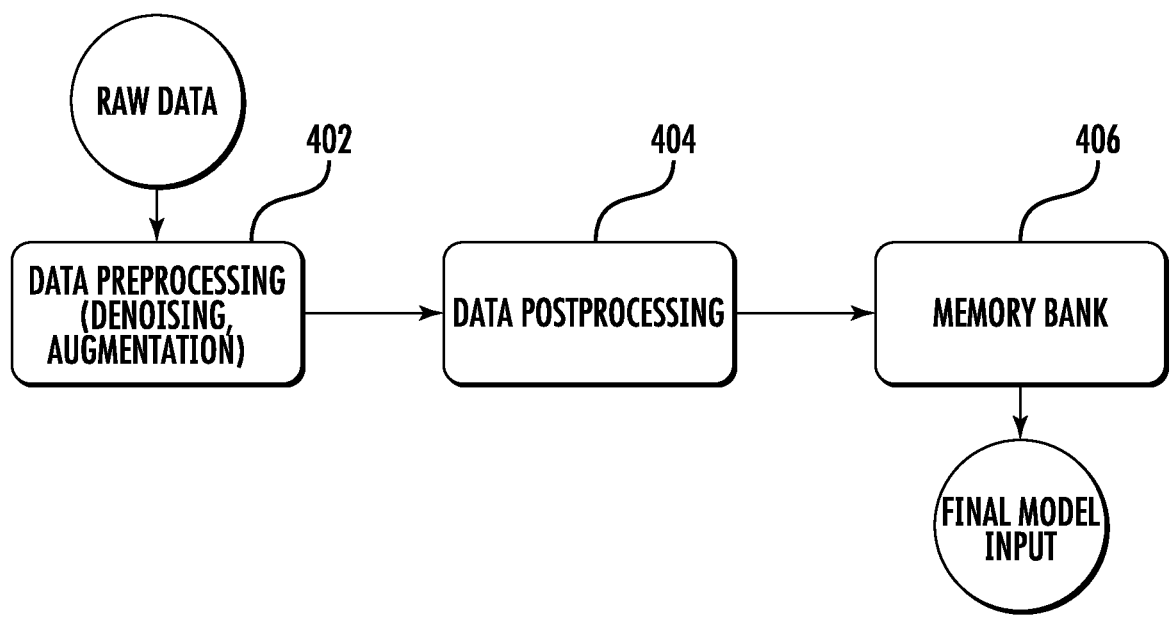
FIG. 4 is a block diagram illustrating the data processing pipeline.

FIG. 4 shows an overall data processing pipeline for manipulation of the training and testing data prior to submitting it to the action recognition model. In this case, raw data is received in the form of the file just described. A data preprocessing 402 step includes a denoising process and a data augmentation process. The data postprocessing step 404 includes the filling in of any missing data via one or more of several techniques, and the storage of the action in the memory bank at step 406. The data is then ready for submission to the action recognition model, either during the training or the testing phase.

For data augmentation purposes, the same data augmentation technique or combination of techniques should be applied to all frames in a video, to enable the temporal tracking of the positions of the joints and to avoid misclassifying the depicted action.

In a first aspect of the invention, the 2D rotation augmentation shifts the position of the skeleton by rotating the skeleton about the sagittal axis. The rotation may occur in either a clockwise or a counterclockwise direction. The transform is given by Eq. (1) wherein (x, y) is the current position of the joint and (x*, y*) is the position of the joint after transformation:

$$\begin{bmatrix} x^* \\ y^* \end{bmatrix} = \begin{bmatrix} \cos\theta & \sin\theta \\ -\sin\theta & \cos\theta \end{bmatrix} \begin{bmatrix} x \\ y \end{bmatrix} \quad (1)$$

Figure 5:
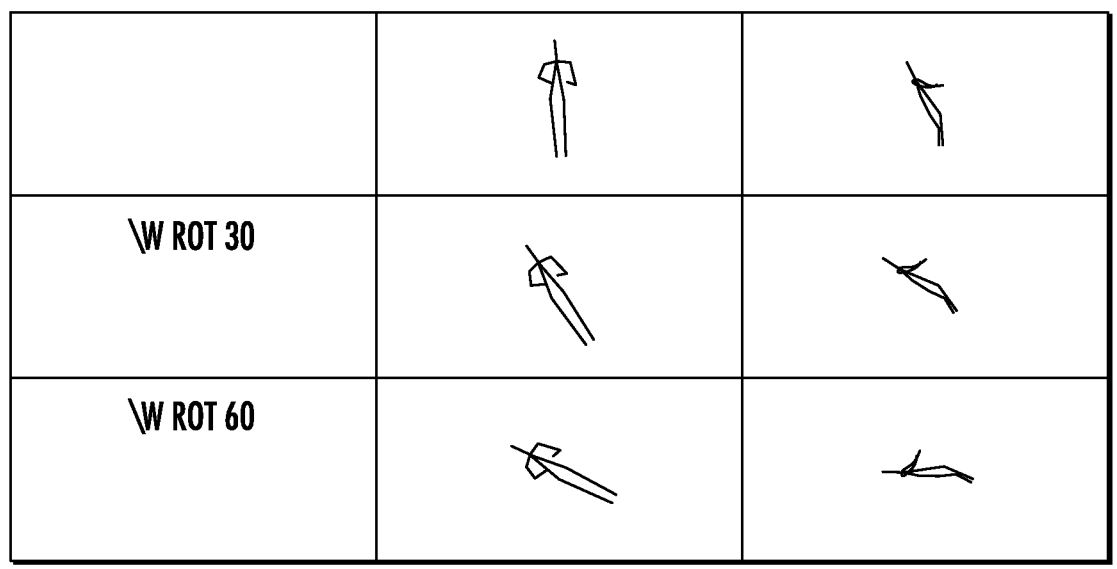
FIG. 5 is an illustration of the effect of the 2D rotation data augmentation.

A visualization of the 2d rotation augmentation is shown in FIG. 5, wherein rotations of 30° and 60° are shown. The rotations may be any angle between −180° and 180°.

In a second aspect of the invention the 2D shear augmentation shifts the position of the skeleton by rotating the skeleton about the vertical and/or the frontal axes. The rotation may occur in either a left or a right direction or a back and forth direction. The transform is given by Eq. (2) wherein (x, y) is the current position of the joint and (x*, y*) is the position of the joint after transformation:

$$\begin{bmatrix} x^* \\ y^* \end{bmatrix} = \begin{bmatrix} 1 & 0 \\ \sin\theta & 1 \end{bmatrix} \begin{bmatrix} 21 & -\tan\theta/2 \\ 0 & 1 \end{bmatrix} \begin{bmatrix} x \\ y \end{bmatrix} \quad (2)$$

Figure 6:
FIG. 6 is an illustration of the effect of the 2D shear data augmentation.
Figure 6:
Figure 6:
Figure 6:
Figure 6:
Figure 6:

A visualization of the 2d shear augmentation is shown in FIG. 6, wherein shear transforms of 45° and 60° are shown.

Figure 7:
FIG. 7 is an illustration of the effect of the scaling data augmentation.
Figure 8:
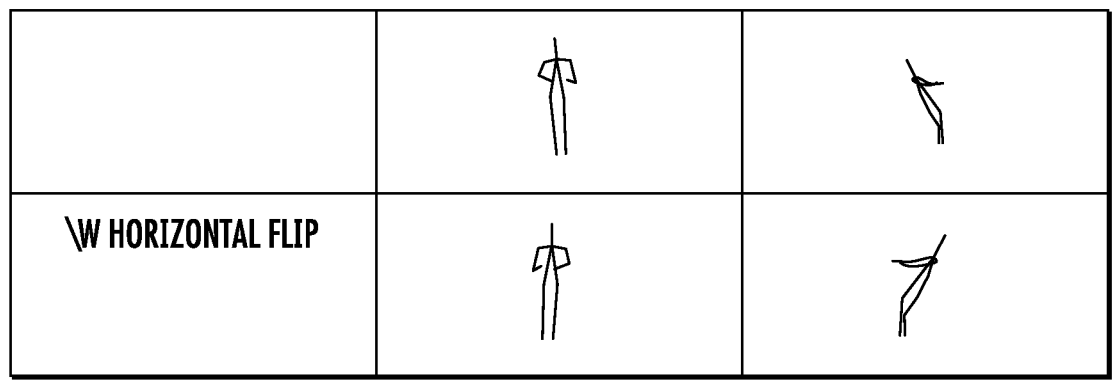
FIG. 8 is an illustration of the effect of the horizontal flip data augmentation.

In a third aspect of the invention, the scaling augmentation makes the skeleton larger or smaller by a predetermined factor. A visualization of the scaling augmentation is shown in FIG. 7, where the skeleton is shown scaled down by a factor or 0.6 and scaled up by a factor of 1.4. The skeleton may also be flipped horizontally, such as to create a mirror image of the skeleton. A visualization of the horizontal flip is shown in FIG. 8.

In a fourth aspect of the invention, the addition of Gaussian noise to the input image tends to make the GCN more robust by simulating real-world conditions in which the input images may be less than optimal, for example, wherein the images are low-resolution or blurry. The transform is given by Eq. (2) wherein (x,y) is the current position of the joint and (x*, y*) is the position of the joint after transformation:

$$(x^*, y^*) = (x + \text{noise\_}x_{Gaussian}, y + \text{noise\_}y_{Gaussian}) \quad (3)$$

Figure 9:
FIG. 9 is an illustration of the effect of the Gaussian noise data augmentation.
Figure 9:
Figure 9:
Figure 9:

A visualization of the addition of Gaussian noise is shown in FIG. 9.

Figure 10:
Figure 11:
Figure 11:
Figure 11:
Figure 11:
Figure 11:
Figure 11:
Figure 12:
Figure 12:
Figure 12:
Figure 12:
Figure 12:
Figure 12:
Figure 13:
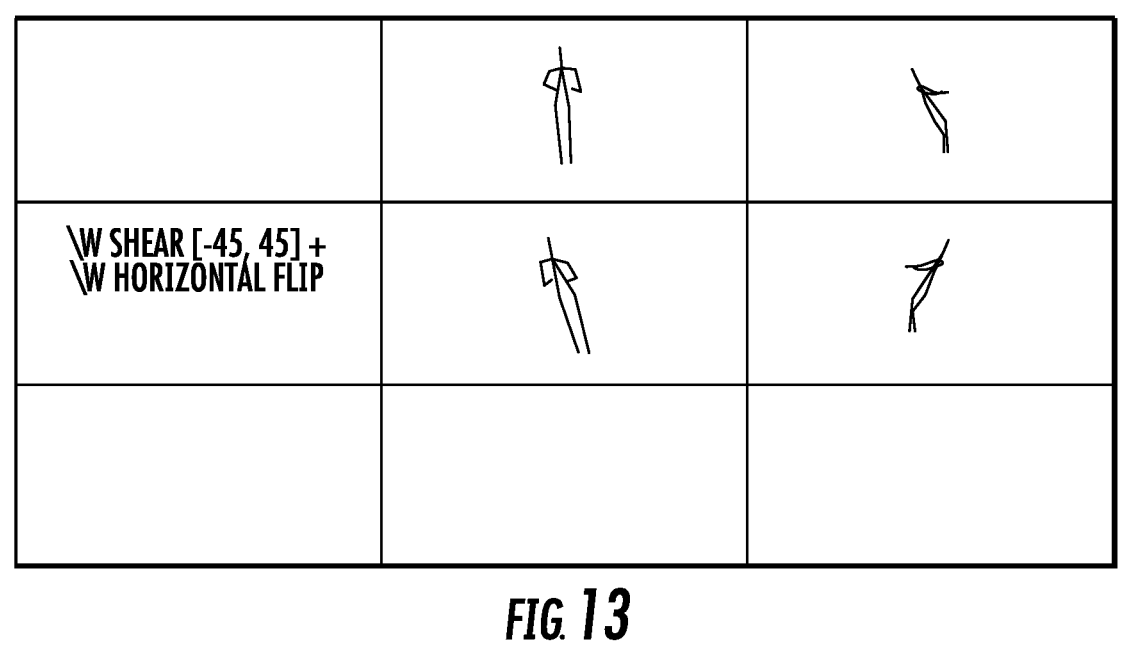
Figure 14:
Figure 14:
Figure 14:
Figure 14:
Figure 15:
Figure 15:
Figure 15:
Figure 15:
Figure 15:
Figure 15:
Figure 16:
Figure 16:
Figure 16:
Figure 16:
Figure 16:
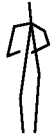
Figure 16:
Figure 17:
Figure 17:
Figure 17:
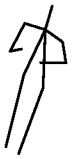
Figure 17:

The data augmentation techniques mentioned in the various aspects of the invention above may be applied by any combination and with any parameters. As examples, FIG. 10 illustrates a combination of the 2D rotation and the 2D shear transformations and a combination of the 2D rotation and the scaling transformations with various parameters; FIG. 11 illustrates a combination of the 2D rotation and the Gaussian noise transformations and a combination of the 2D rotation and the horizontal flip transformations with various parameters; FIG. 12 illustrates a combination of the 2D shear and the scaling transformations and a combination of the 2D shear and the Gaussian noise transformations with various parameters; FIG. 13 illustrates a combination of the 2D shear and the and the horizontal flip transformations with various parameters; FIG. 14 illustrates a combination of the Gaussian noise and the horizontal flip transformations with various parameters; FIG. 15 illustrates a combination of the 2D rotation, the 2D shear and the scaling transformations and a combination of the scaling, the Gaussian noise and the horizontal flip transformations with various parameters; FIG. 16 illustrates a combination of the 2D rotation, the 2D shear, the scaling and the Gaussian noise transformations and a combination of the 2D shear, the scaling, the Gaussian noise and the horizontal flip transformations with various parameters; and FIG. 17 illustrates a combination of the 2D rotation, the 2D shear, the scaling, the Gaussian noise and the horizontal flip transformations with various parameters.

Dataset Preprocessing

Various methods may be used to pre-process the datasets. These include data denoising, the sorting of skeletons based on motion, the selection of two main actors and the translation of sequences. Preprocessing also includes a memory bank.

Denoising—In a primary embodiment of the invention, various data preprocessing techniques are applied both to the training data and to the testing data. The preprocessing techniques include denoising techniques, sorting bodies based on motion, the selection of two main actors in each frame and the translation of sequences, all of which will now be explained.

A determination of whether or not video clips in the training and testing datasets should be kept or discarded may be based on an overall noise score for the video clip:

$$\text{Noise Score} = \frac{\text{\# of noisy frames in the clip}}{\text{\# of frames in the clip}} \quad (4)$$

Figure 18:
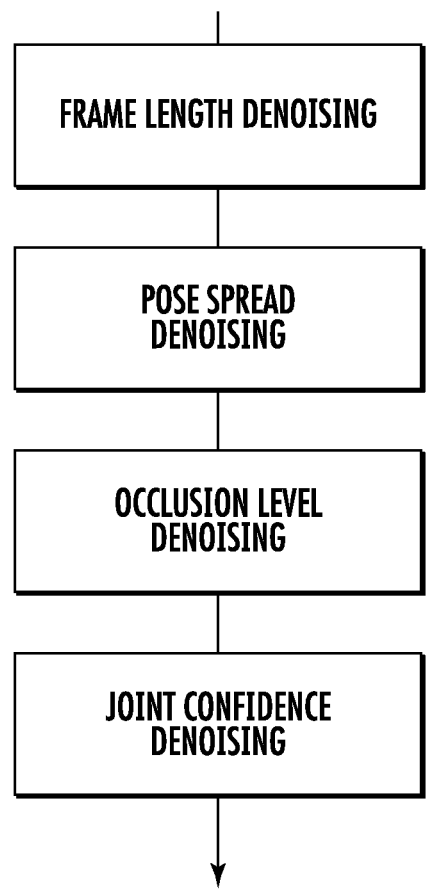
FIG. 18 is a summary of the various techniques used for denoising of the training and testing datasets.

The noise score is measured with a series of denoising processes that includes, as shown in FIG. 18, frame length denoising, pose spread denoising, occlusion level denoising and joint confidence denoising.

Figure 19A:
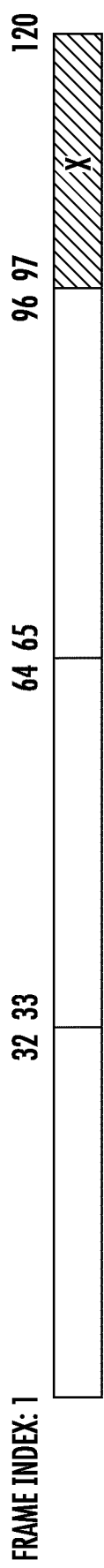
FIGS. 19A, 19B illustrate the frame length denoising technique.
Figure 19B:
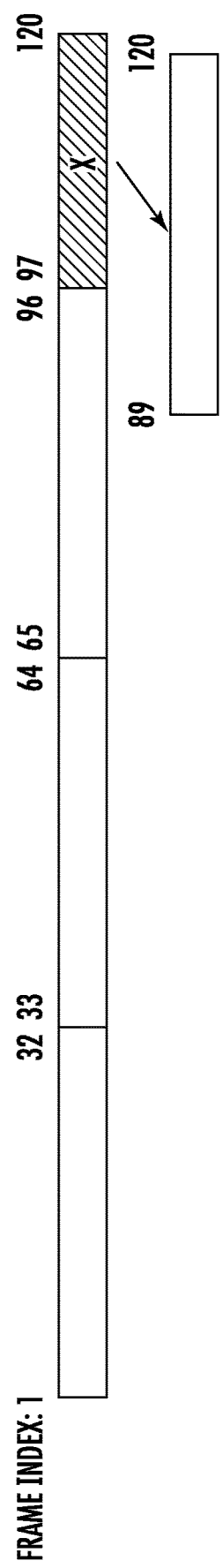

Frame Length Denoising—Video clips are split into smaller clips of a given size, in one embodiment, 32 frames per clip. This may leave a clip at the end of the video that is less than the minimum clip size (i.e., frames 97-120 in FIG. 18A). Frame length denoising refers to methods to deal with the last clip when the last clip is less than the minimum clip size. In one embodiment, as shown in FIG. 19A, the last frames may be discarded. In an alternative embodiment, shown in FIG. 19B, some frames may be backtraced to fill the last clip with additional frames to meet the minimum clip length. In the example shown in FIG. 19B, frames 97-120 are replaced with frames 89-120 to bring the total frame count to 128 (4 clips of 32 frames each). The backtracing method obviously allows more clips to be retained in the training and testing datasets.

Figure 20A:
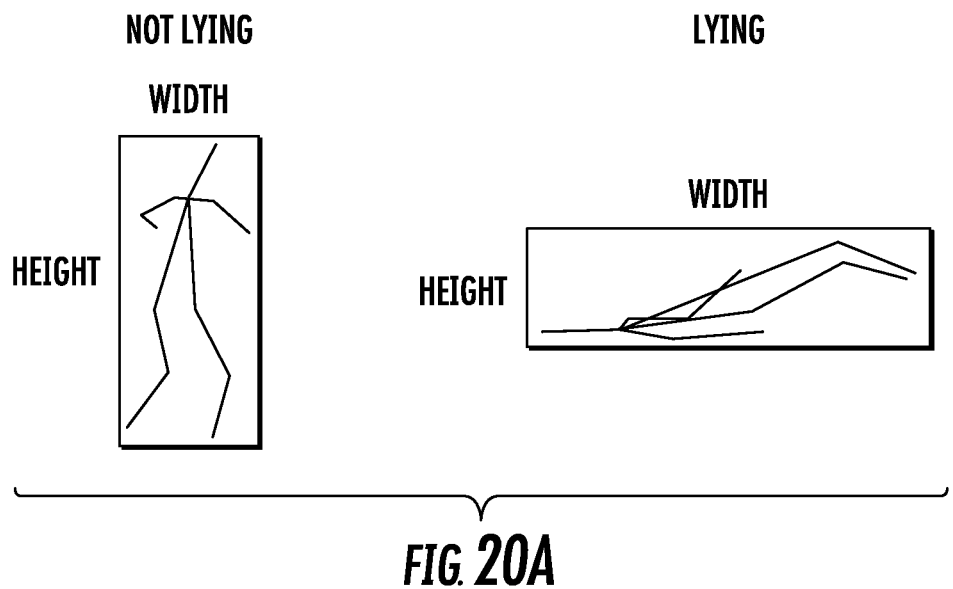
FIGS. 20A, 20B illustrate the pose spread denoising technique.

Pose Spread Denoising—Action classes may be classified as "lying" or "not lying", examples of which are shown in FIG. 20A. Fames can be determined to be noisy based on a spread of the X and Y values ion the frame and width of the skeleton (NST—noise_spread_threshold). The NST is defined for each classification. For the lying and classified action classes, a frame is determined to be not noisy if:

$$\text{width} \leq NST * \text{height}$$

Likewise, for not_lying action classes, the frame is determined to be not noisy if:

$$\text{height} \leq NST * \text{width}$$

Figure 20B:
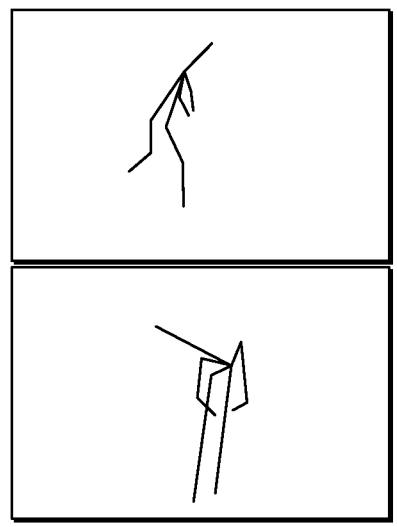

FIG. 20B shows frames that were determined to be noisy. In some cases, because the width to height ration of a frame is dependent not only on the action class, but also on the viewpoint, the pose spread denoising process may not be performed.

Figure 21:
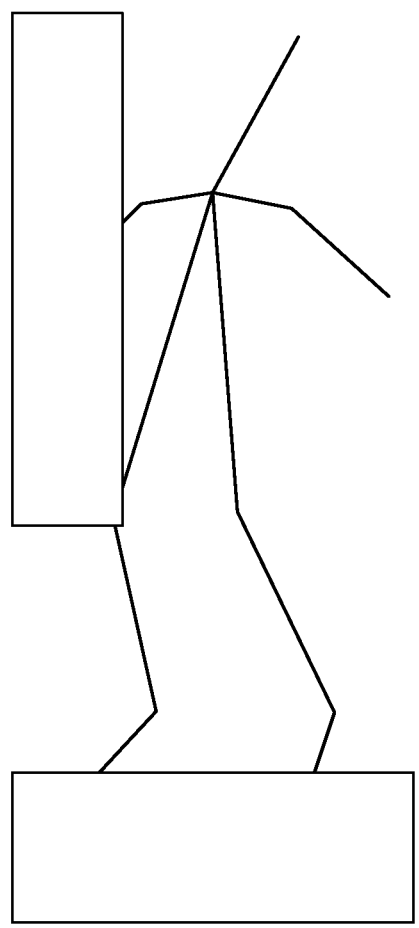
FIG. 21 is an example of the joint occlusion denoising technique.

Occlusion Level Denoising—FIG. 21 shows an example of a skeleton having several joints occluded. In various embodiments, a frame may be determined to be noisy based on the percentage of joints that are occluded. For example, a frame may be determined to be noisy if 40% of the joints are occluded.

Figure 22:
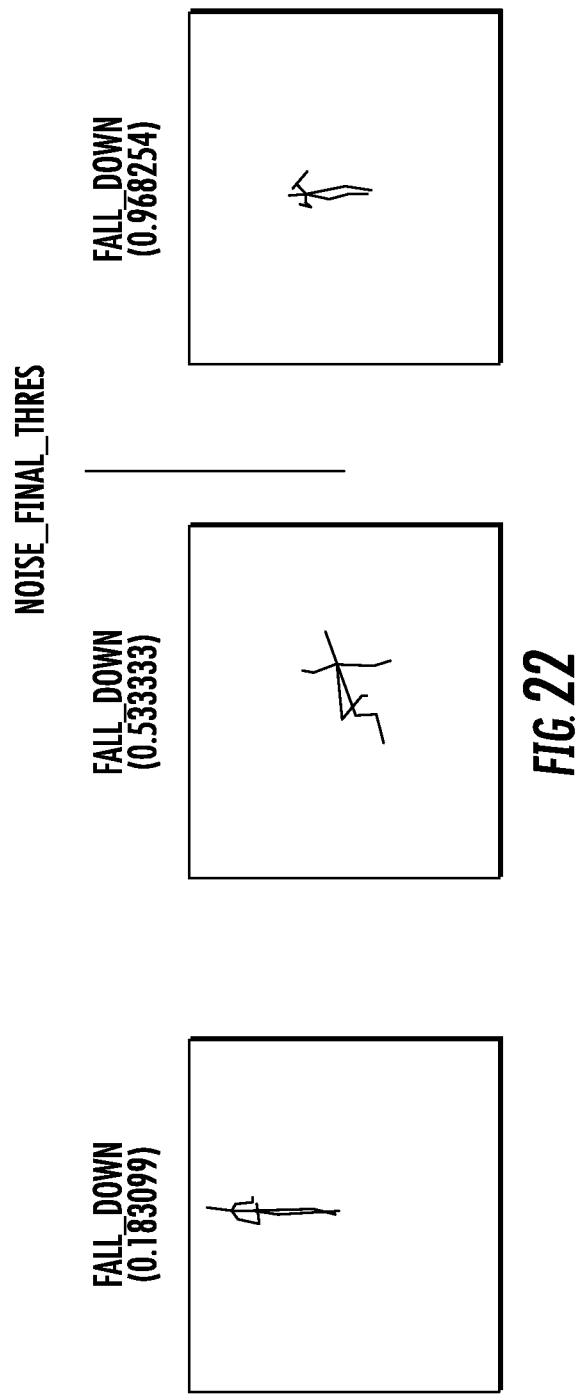
FIG. 22 is an example of the joint confidence denoising technique.

Joint Confidence Denoising—There may be a confidence level associated with the identification and positioning of each joint in the skeleton. A joint may be determined to be noisy of its confidence score falls below a joint_conf_threshold. When the number of joints determined to be noisy rises above a noise_num_joint_threshold, then the frame is determined to be noisy. Each action class may have different thresholds for both the joint confidence level and the number of joints. FIG. 22 shows an example of joint confidence denoising.

The denoising techniques disclosed above may be used in any combination. The techniques for data augmentation and preprocessing disclosed herein were benchmarked on the NTU RGB+D dataset, which contains 120 action classes and 114,035 video samples. Compared with other datasets, NTU RGB+D contains the most interesting action classes suitable for this task. The use of the techniques with other training and testing datasets is contemplated to be within the scope of the invention.

Sorting of Bodies—The skeletal representations can be sorted based on motion by choosing skeletons with prominent motions (i.e., bigger movement instead of still action). The motion can be measured by calculating the variance of sequence joints.

Figure 23:
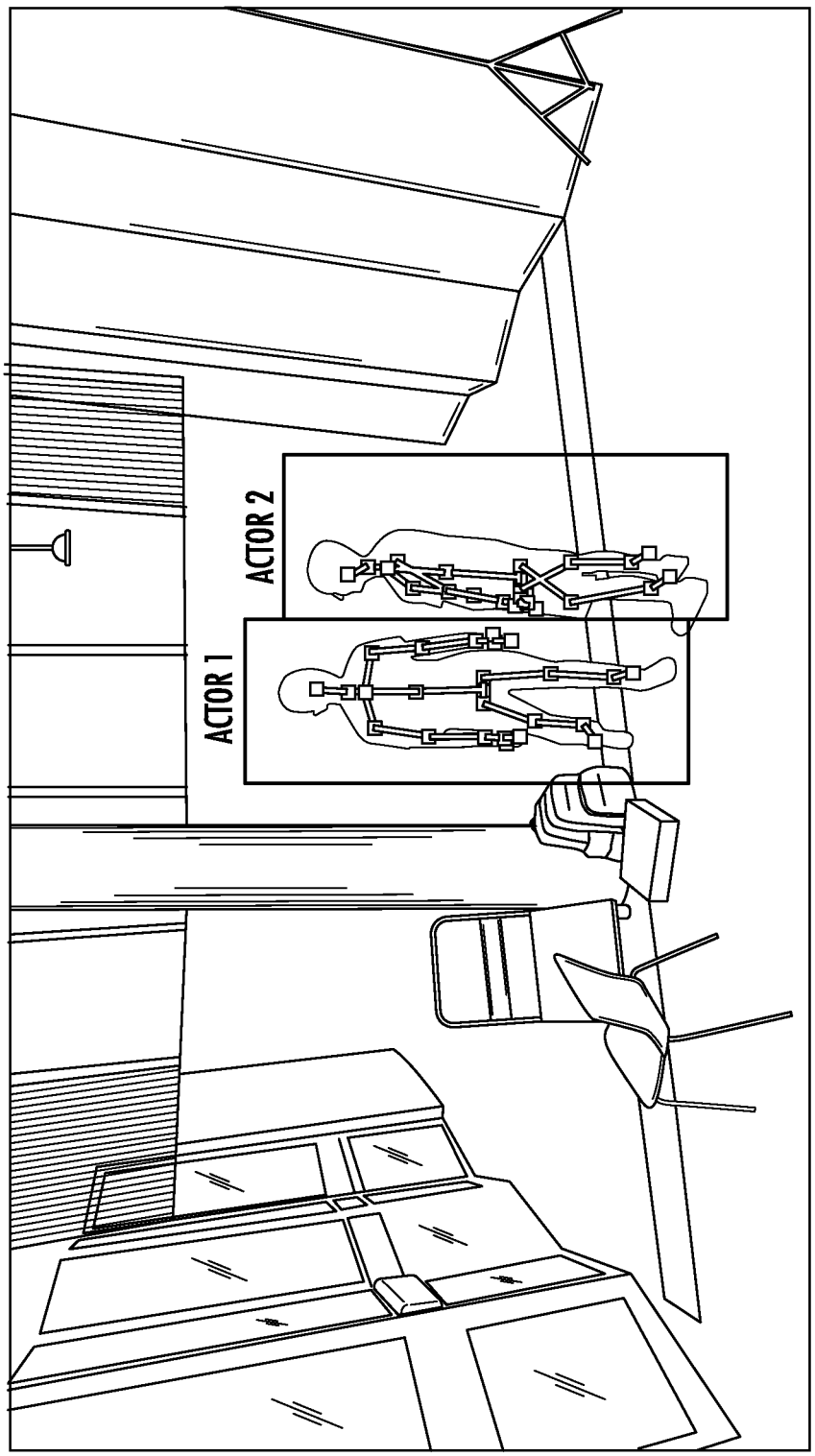
FIG. 23 is an illustration of the selection of two main actors.

Selection of Two Main Actors—This preprocessing step applies to video frames having multiple skeletal actors. In this preprocessing step, the top 2 skeletons with the biggest motion are selected and the rest are ignored. A representation of this technique is shown in FIG. 23.

Translation of Sequences—In this preprocessing technique, the data is normalized. Data values in a reasonable range are formed and the data is represented in a specific format (e.g., a tensor). All sequences are aligned with the same frame length and the same size of joint array. For example, if there is only one actor in the sequence, the data will comprise the actor's joint coordinates, while if there are two actors, the data will comprise both actor's joint coordinates.

Dataset Post-Processing

Figure 24:
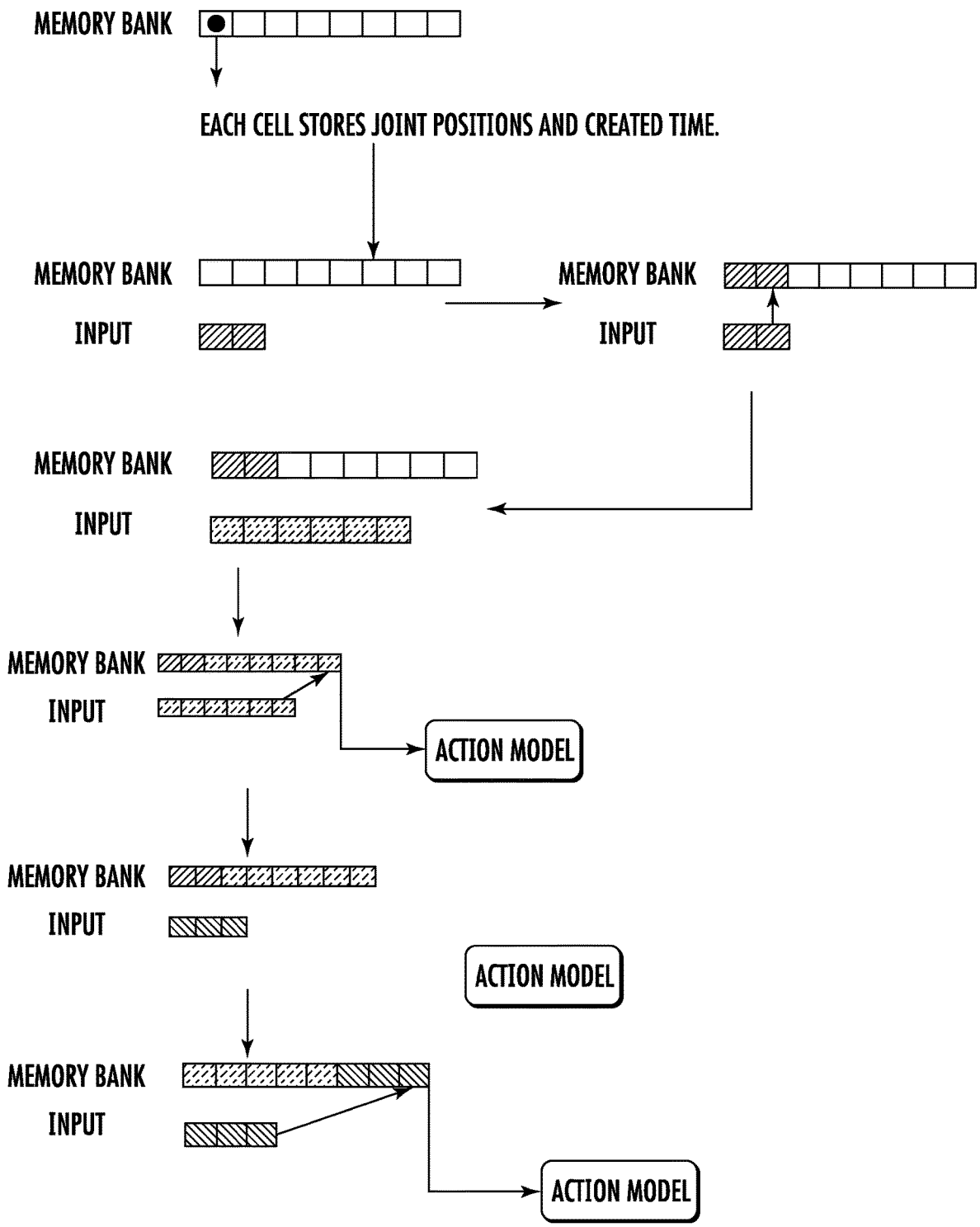
FIG. 24 is an illustration of the memory bank.

Memory Bank—The memory bank is a storage/cache to collect data that is processed with post-process methods for the model input. Basically, it is a first-in-first-out queue with a predetermined size (e.g., 32, 8, etc.). The reason for the memory bank is that there may be data missing/discontinuous problems under some situations (e.g., data streaming error, network connection error, human body tracker is not functional, etc). In such situations, the need to have the predetermined minimum number of frames for each video clip still exists, based on the particular model selected to deploy the action recognition model. In such situations, the memory bank is used as a cache to keep the remaining data available at that moment and the data post-processing methods are used to create new elements (data) to fill the gap instead of just feeding null/zero data. The use of the memory bank to fill missing gaps in the sequence is shown graphically in FIG. 24.

Figure 25:
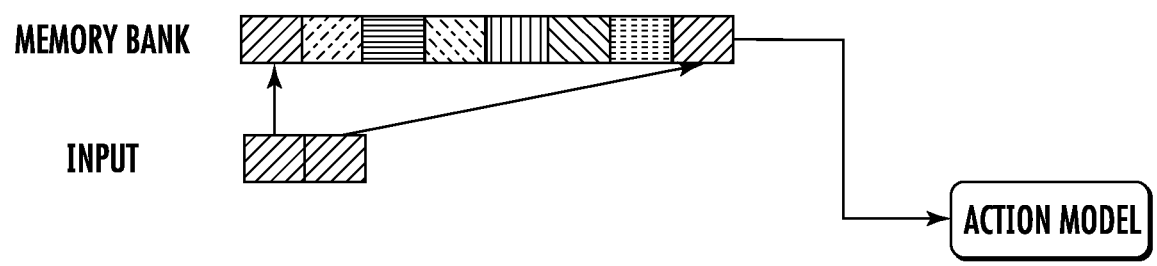
FIG. 25 is an illustration of the interpolation technique to fill in missing data.

Interpolation—This is a method to fill missing values in an interpolation manner. For example, as shown in FIG. 25, if the size of the memory bank is 8, only two-frame data is available at that moment, which are 1 and 8 respectively. With Interpolation method, the memory bank is filled with the values (1,2,3,4,5,6,7,8) sequentially, where values 2-7 are new elements created by linear interpolations.

Figure 26:
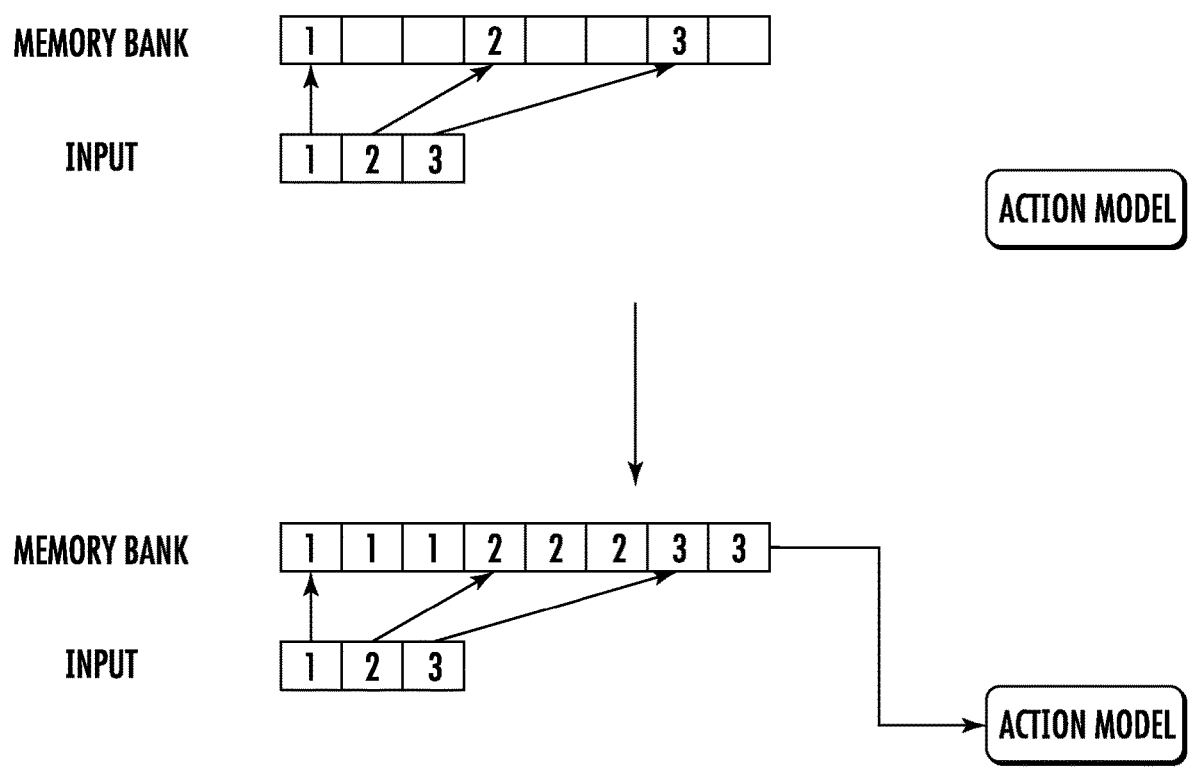
FIG. 26 is an illustration of the duplication technique to fill in missing data.

Duplication—This is a method to fill missing values in a duplicate way. As shown in FIG. 26, (1,2,3) are originally available. The memory bank is then filled with the values (1,1,1,2,2,2,3,3).

Figure 27:
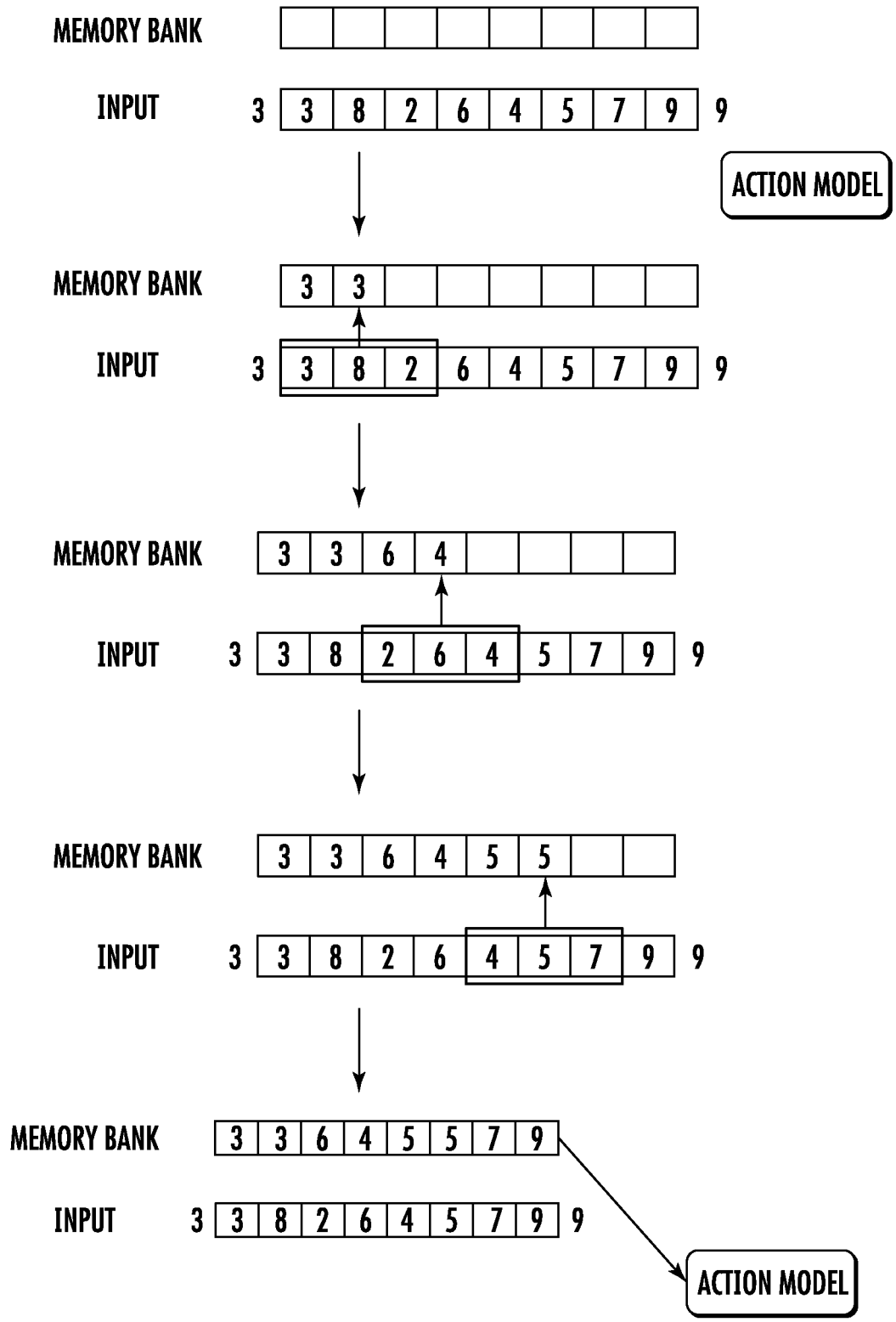
FIG. 27 is an illustration of the median filtering technique to fill in missing data.

Median Filtering—This is a method to fill values in a median way. As shown in FIG. 27, (3,8,2,6,4,5,7,9) is originally available. The memory bank is then filled with the values (3,3,6,4,5,5,7,9) with the sliding window size of 3, based on a median of the three values).

As would be realized by those of skill in the art, the data augmentation and preprocessing techniques disclosed herein may be used in any combination on any dataset. Specific examples used herein are not meant to limit the invention in any way. The scope of the claimed invention is given by the following claims:

The invention claimed is:
1. A method of denoising an action dataset comprising video clips of actions comprising:
breaking the video clips into one or more fixed length clips of a predetermined number of frames;
determining the number of frames in the fixed number of frames that are noisy;

determining a ratio of the number of noisy frames to the total number of frames in the fixed length clip; and removing the fixed length clip from the dataset when the ratio exceeds a predetermined noise threshold;

wherein skeletal representations of one or more persons in the fixed length clips are extracted from each frame of the fixed length clips, the skeletal representations comprising a set of joint coordinates defining locations of joints of the skeletal representation in a coordinate system defined in the context of each frame.

2. The method of claim 1 further comprising:

removing clips having less that the predetermined number of frames from the dataset.

3. The method of claim 1 further comprising:

backtracing clips having less than the predetermined number of frames with frames from previous fixed length clips in a series of fixed length clips.

4. The method of claim 1 further comprising:

for each frame in the fixed length clip, determining a ratio of the width to the height of a skeleton wherein the width and height are determined by a maximum spread of horizontal coordinates and vertical coordinates of the joints of the skeletal representation; and marking a frame as noisy when the width to height ratio is below a predetermined spread threshold.

5. The method of claim 1 further comprising:

for each frame in the fixed length clip, determining a number of joints in the skeletal representation that are occluded; and determining that a frame is noisy when the total number of occluded joints exceeds a predetermined occlusion threshold.

6. The method of claim 1 wherein each joint coordinate is accompanied by a confidence level, further comprising:

for each frame in the fixed length clip, determining that the confidence level of the joint coordinates fall below a predetermined joint confidence threshold; and determining that a frame is noisy when the number of joint coordinates falling below a predetermined joint confidence threshold exceeds a predetermined frame confidence threshold.

7. The method of claim 1 wherein frames can be determined to be noisy by any combination of pose spread denoising, occlusion level denoising and joint confidence denoising.

8. The method of claim 1 wherein the dataset is augmented with additional samples of fixed length clips, the additional samples comprising 2D rotations of the skeletal representations about its sagittal axis in one or more existing fixed length clips.

9. The method of claim 1 wherein the dataset is augmented with additional samples of fixed length clips, the additional samples comprising 2D shears of the skeletal representations in one or more existing fixed length clips.

10. The method of claim 1 wherein the dataset is augmented with additional samples of fixed length clips, the additional samples comprising up or down scaling of the skeletal representations in one or more existing fixed length clips.

11. The method of claim 1 wherein the dataset is augmented with additional samples of fixed length clips, the additional samples comprising horizontal flips of the skeletal representations in one or more existing fixed length clips.

12. The method of claim 1 wherein the dataset is augmented with additional samples of fixed length clips, the additional samples comprising the addition of Gaussian noise to one or more of the video clips.

13. The method of claim 1 wherein the dataset is augmented using any combination of 2D rotation, 2D shear, scaling, horizontal flipping and adding Gaussian noise to create additional samples to be added to the dataset.

14. The method of claim 1 further comprising:

sorting the skeletal representations based on motions;

wherein the motion is measured by a calculated variance of the joint coordinates.

15. The method of claim 14 further comprising:

choosing a predetermined number of skeletal representations with the largest motions.

16. The method of claim 15 further comprising:

normalizing the dataset by aligning each fixed length clip with a same size frame and same size joint array.

17. The method of claim 1 further comprising:

creating a memory bank of action sequences to be used to fill in data missing from the sequences.

18. The method of claim 17 further comprising:

using linear interpolation to fill in missing data in memory bank sequences.

19. The method of claim 17 further comprising:

filing in missing data in memory bank sequences by duplication of existing data.

20. The method of claim 17 further comprising:

using median filtering to fill in missing data in memory bank sequences.

* * * * *